United States Patent [19]

Marosi

[11] 3,849,208

[45] Nov. 19, 1974

[54] WHITE, OPAQUE CONVERSION COATING ON ALUMINUM

[75] Inventor: Michael N. Marosi, Encino, Calif.

[73] Assignee: Convertex, Ltd., Los Angeles, Calif.

[22] Filed: Aug. 13, 1973

[21] Appl. No.: 388,065

[52] U.S. Cl. .................... 148/6.27, 117/75, 117/134

[51] Int. Cl. .............................................. C23f 7/00

[58] Field of Search ........ 148/6.27, 6.14 A; 117/75, 117/134

[56] References Cited

UNITED STATES PATENTS

| | | | |
|---|---|---|---|
| 2,836,526 | 5/1958 | Marosi | 148/6.27 |
| 3,382,081 | 5/1968 | Cutter et al. | 148/6.27 X |
| 3,607,452 | 9/1971 | Marosi | 148/6.27 X |

*Primary Examiner*—Ralph S. Kendall
*Attorney, Agent, or Firm*—Louis J. Bachand

[57] ABSTRACT

White, opaque conversion/organic coatings on aluminum structural elements are obtained by altering the element surface by reaction with halide activated moderately acidic polycarboxylic acid solution, and coating the altered surface with a clear resinous coating.

19 Claims, No Drawings

WHITE, OPAQUE CONVERSION COATING ON ALUMINUM

BACKGROUND OF THE INVENTION

This invention has to do with structural aluminum elements useful in automotive, architectural and decorative applications. More particularly the invention is concerned with a method of providing such aluminum elements with a white, opaque surface coloration of great beauty. This method produces a surface treatment on aluminum which because of its superior toughness and durability in handling and weathering is functionally advantageous and which because realized without electrochemical processing is lower in cost, and commercially more attractve than other methods. Moreover, the opaque, white surface cannot be realized with anodizing, currently the most widely practiced conversion coating technique.

PRIOR ART

The art and science of contributing color to aluminum have been highly developed. Primary amount such techniques are painting which is broadly inclusive of organic, pigmented coatings, and anodizing, either of which techniques may give a wide variety of color. Paint, however is subject to deterioration over time, and anodizing does not give an opaque, white color. Conversion coatings on aluminum are known e.g., see my earlier patent U.S. Pat. No. 2,836,526, in which chemical reaction at the aluminum element surface is used to improve the performance of the element against weather, or to improve the bonding of organic coatings to the element, or to contribute a particular, desired, aesthetic effect, or all three purposes may be realized.

Despite its obvious aesthetic appeal, deep, glossy, opaque white coatings have not been available on aluminum through conversion coating processes, but only by the use of paints which is undesirable where maintenance is necessarily kept to a minimum, as in architectural applications. In addition to brilliance and opacity, a suitable white conversion coating for aluminum structural elements will need to retain these qualities over time despite subjection to atmospheric contaminants, salt, moisture and radiation. Thus far, anodizing has not been able to provide an opaque white surface colored, aluminum, structural, e.g. architectural element. The achieving of a brown to black coating is described in my earlier patent, U.S. Pat. No. 3,607,452, wherein an acrylic polymer and iron is used to form the color layer and a clear acrylic polymer overcoat is superadded.

In my earlier mentioned U.S. Pat. No. 2,836,526, techniques for obtaining a clear, not white and not opaque coating were disclosed. It has now been discovered that by several critical adjustments of higher pH and longer time, certain organic acids when processed as now to be described are both white and opaque, unlike the coatings realized following the teachings of U.S. Pat. No. 2,836,526.

PREFERRED EMBODIMENTS

More particularly the invention contemplates a first step of surface reacting the aluminum metal element to be treated to alter the optical properties of the surface in a special way distinctively conducive to opaque, white coloration of the surface, and thereafter realizing the white opacity through overcoating the treated, altered surface with a clear, nonpigmented resinous film.

The operating parameters for the initial treating step are narrowly critical, but the resinous overlayer may generally be any film forming material, not contributing a color of its own, and suitably weathering resistant, per se, where exposure to sun and salt is envisioned, as in building exterior applications.

In carrying out the method, an aluminum element is cleaned of oil, grease and the like with a dilute detergent solution, deoxidized if necessary with a light treatment in dilute caustic e.g. 5–15 percent by weight NaOH at elevated temperatures, and thus cleaned is subjected to the novel treatment now to be described.

A bath is prepared by dissolving in water a halide ion precursor e.g. a chloride or flouride inorganic salt, and the polycarboxylic acid reagent, particularly citric acid which is highly effective and which will be used for illustrative pruposes hereinafter. The solution is dilute. Typical concentrations are 10 to 20 percent by weight halide ion and 2 to 20 percent by weight of the polycarboxylic acid with 14 to 16 percent halide ion by weight being highly satisfactory, and 3 to 5 percent of the polycarboxylic acid being highly preferred. The pH of the bath must be between 3.3 and 4.0 to realize the white, opaque surface referred to herein, since lower pH, e.g., below 3 will yield a clear, not white and not opaque coating as taught in my earlier patent U.S. Pat. No. 2,836,526. An even narrower pH range of 3.3 to 3.5 is highly preferred. The bath temperature is ambient or moderately elevated. A temperature range of 50° to 110°F is generally used.

After preparation of the bath, the aluminum element is immersed therein as the most effective technique for ensuring the duration and intimacy of contact necessary for the reaction to take place, although flushing or heavy spraying of the surface might be used in some circumstances. As noted the aluminum surface is precleaned to be free of oxide and contaminants prior to immersion in the bath. Times of immersion are brief, e.g., 5 to 30 minutes with times up to 1 hour or more being useful but conferring no particular advantage over the 30 minute maximum in the range given. Less than 5 minutes immersion, particularly at the lower temperature and concentration may not yield the white opaque coloration. See U.S. Pat. No. 2,836,526.

Following immersion in the bath for the requisite time, the element is removed and water rinsed before the overcoating step, to prevent contamination of the overcoating system and to enhance the bonding of the resinous coating to the treated substrate. After one or two water rinses, e.g., by dipping, the element is ready for the opaque white coloration producing step.

Surprisingly, the opaque white coloration is produced by the application of a clear, nonpigmented, undyed, resinous film over the halide activated-polycarboxylic acid solution treated surface, without more. The activated acid treatment chemically alters the aluminum surface in such wise that a physical change in the crystalline structure forming the element surface occurs, in a presently undetected manner. The effect of the change is seen in the production of an opaque white coloration upon the second important step in the method: application of the resinous film overcoating.

The optical and chemical mechanisms to account for the obtaining of an opaque white colored surface on aluminum according to the invention are not fully understood, nonetheless, and without wishing to be bound to any particular theoretical explanation of the phenomenon observed in practice of the method herein, it may be theorized that the usual refractive, absorptive and/or reflectivity properties of the elemental aluminum metal surface are first chemically altered to be different in optical response by the reaction therewith of the halide activated polycarboxylic acid in solution, under the narrow pH conditions. The thus chemically altered surface, still not apparently a brilliant white in coloration, is then coated with a clear resinous, film forming coating having its own refractive, absorptive and reflective qualities, which are different from either the elemental aluminum or the chemically altered aluminum surface in this respect. The juxtaposition of the resinous, film coating with its refractive properties and the chemically treated aluminum surface with its refractive, absorptive and reflective properties altered from the elemental aluminum properties then causes a combination of refractive, reflective and absorptive modifications to the incident light radiation which results in the surface having a white, opaque aspect to the eye.

In any case, to obtain the opaque, white appearance, the halide activated polycarboxylic acid pretreated element surface is coated with from 0.1 to 10 or more mils of resinous film. Lacquers may be used as the resinous coating, but the superior handling abilities and tailored weathering properties of now available synthetic organic polymers dictates the use of these latter resinous products as the film forming resin.

Many resins will be useful if clear and film forming and of course adherent to the chemically altered, treated surface.

Preferred resins are the acrylic and methacrylic polymers and copolymers, which have the advantages of outstanding weatherability, clarity, and availability in water emulsion form. Particularly useful are copolymers of acrylic acid, or methacrylic acid with an ethylenically unsaturated hydrocarbon e.g., having two carbon atoms, i.e., ethylene-acrylic acid, or ethylene-methacrylic acid copolymers; copolymers of alkyl esters of these acids particularly the methyl and ethyl acrylate esters with ethylene and aromatic ethylenically unsaturated hydrocarbons such as and particularly styrene. Styrene-acrylic, styrene-methacrylic and styrene or ethylene ethyl acrylate and methyl metharcylate copolymers are highly preferred, particularly those containing from 10 to 70 parts of the acid, or acid ester and the balance styrene or ethylene. Generally then, it is preferred to employ as the resinous overcoat an acrylic or methacrylic acid, or acid methyl or ethyl ester of such acid, copolymerized with an ethylenically unsaturated aliphatic or aromatic hydrocarbon having two to eight carbon atoms.

Following coating with the resin, the water if an emulsion, or solvent if a solution, is driven off by heating, to bake the overcoating onto the chemically altered aluminum surface, as a continuous film; which element thus has an opaque, white surface coloration.

The polycarboxylic acids useful herein are the saturated dicarboxylic acids and tricarboxylic acids having from two to eight carbon atoms, and mono or dihydroxy-substituted saturated dicarboxylic acids and tricarboxylic acids having two to eight carbon atoms. Specifically worthy of mention are these acids: oxalic, malonic, succinic, glutaric, adipic, pimelic, and suberic acids, as well as tartaric and citric acids. Of these acids, citric is most preferred.

As noted pH is highly significant in obtaining the observed results herein. pH of the surface treating bath must be 3.3 and higher up to 4.0. A pH between 3.3 and 3.5 is entirely satisfactory, while pH less than 3.0 is not productive of the opaque white coloration, after film covering, desired according to the invention.

The halide ion may be derived from a water soluble salt including the alkali metal salts of fluorine, chlorine, bromine and iodine, and particularly the sodium, potassium, and lithium sales of these halogens. For this purpose, however, the floride ion is highly preferred, particularly as derived from solutions of alkali metal hydrogen salts of fluoric acid, e.g., sodium acid fluoride NaF·HF or potassium acid floride KF·HF, in the aqueous polycarboxylic acid solution bath.

Suitable concentrations of halide salts in the conversion coating solution are between 10 and 20 percent of the bath solution. Preferred concentrations of water soluble acid fluoride salts are particularly between 14 and 16 percent of the bath solution, by weight.

Suitable bath temperatures are not less than 50°F and not more then 110°F and generally are between 60°F and to 90°F and preferably between 70°F to 80°F, and even more particularly about 72°F. Times of immersion are generally at least about five minutes up to 30 minutes, or longer.

EXAMPLE

An aluminum window frame section is washed in an agitated 1 percent detergent solution, dipped in 5 percent agueous caustic at an elevated temperature less than 100°F for five minutes, then immersed in a 3–5 percent solution (pH 3.4) of citric acid containing potassium acid fluoride at 14–16 percent at a temperature of 72°F for 10 minutes. After rinsing the halide and acid from the part, the part is immersed in a commercial acrylic copolymer emulsion and after less than five minutes is withdrawn, dipped briefly and force dried in an oven.

A brilliant, deep, uniformly opaque white surfaced section is obtained. This section may be bent back on itself without chipping, cracking or flaking off of the coating, illustrating a further important advantage of the opaque, white coating method hereinabove disclosed.

I claim:

1. Method of forming opaque white conversion coatings on aluminum structural elements comprising caustic etching and cleaning the surface, surface reacting the element for 5 to 30 minutes in a bath at a temperature between 50° and 110°F, said bath having a pH not less than 3.3 and not more than 4, and consisting essentially of from 10 to 20 percent by weight halide ion, and from 2 to 20 percent by weight of a saturated, di- or tricarboxylic acid having from two to eight carbon atoms and water, rinsing the surface and thereafter overcoating with a clear, colorless resinous film.

2. Method according to claim 1 in which said bath contains from 14 percent to 16 percent by weight halide ion.

3. Method according to claim 2 in which said halide ion is selected from fluoride and chloride ion.

4. Method according to claim 1 in which said bath contains from 3 percent to 5 percent by weight of said polycarboxylic acid.

5. Method according to claim 1 in which said bath has a pH between 3.3 and 3.5.

6. Method according to claim 5 in which said halide ion is selected from fluoride and chloride ion.

7. Method according to claim 6 in which said polycarboxylic acid is dicarboxylic.

8. Method according to claim 6 in which said polycarboxylic acid is tricarboxylic.

9. Method according to claim 8 in which said tricarboxylic acid is citric acid.

10. Method according to claim 9 in which said bath contains from 3 to 5 percent by weight citric acid.

11. Method according to claim 10 in which said bath contains from 14 percent to 16 percent by weight halide ion.

12. Method according to claim 11 in which element is immersed in said bath for about 10 minutes.

13. Method according to claim 12 in which said halide ion is fluoride.

14. Method according to claim 13 in which said fluoride ion is obtained by dissolving potassium acid fluoride in said bath.

15. Method according to claim 1 in which the resinous film overcoating comprises synthetic organic polymer.

16. Method according to claim 15 in which the synthetic organic polymer comprises an acrylic or methacrylic acid or methyl or ethyl acrylic or methacrylic acid ester copolymer with an ethylnically unsaturated hydrocarbon containing from 2 to 8 carbon atoms.

17. Method according to claim 16 in which said element surface is immersed in an aqueous emulsion of said copolymer and dried with heating to coat the surface.

18. Aluminum structural element having a white opaque surface prepared by the method of claim 1.

19. Aluminum element having a white opaque surface prepared by the method of claim 17.

* * * * *